(12) United States Patent
Nacke et al.

(10) Patent No.: US 12,247,894 B2
(45) Date of Patent: Mar. 11, 2025

(54) TORQUE MEASUREMENT WITH CORRECTION OF AN EXTERNAL MAGNETIC FIELD

(71) Applicant: NCTE AG, Oberhaching (DE)

(72) Inventors: Julian Nacke, Munich (DE); Florian Eckschlager, Riemerling (DE); Bernhard Mayr, Munich (DE)

(73) Assignee: NCTE AG, Oberhaching (DE)

( * ) Notice: Subject to any disclaimer, the term of this patent is extended or adjusted under 35 U.S.C. 154(b) by 265 days.

(21) Appl. No.: 17/865,638

(22) Filed: Jul. 15, 2022

(65) Prior Publication Data
US 2023/0015343 A1     Jan. 19, 2023

(30) Foreign Application Priority Data
Jul. 19, 2021   (EP) ..................... 21186292

(51) Int. Cl.
*G01L 3/10*     (2006.01)
(52) U.S. Cl.
CPC .............. *G01L 3/102* (2013.01); *G01L 3/104* (2013.01)
(58) Field of Classification Search
CPC ................................ G01L 3/102; G01L 3/104
USPC ..................................... 73/862.333
See application file for complete search history.

(56) References Cited

U.S. PATENT DOCUMENTS

| | | | |
|---|---|---|---|
| 2010/0242626 A1* | 9/2010 | Weng ....................... | G01L 3/105 73/862.333 |
| 2018/0231425 A1* | 8/2018 | Raths Ponce ........... | G01L 3/105 |
| 2020/0264062 A1* | 8/2020 | Park ...................... | G01L 25/003 |

FOREIGN PATENT DOCUMENTS

| EP | 2799327 A1 | 11/2014 |
|---|---|---|
| EP | 3050790 B1 | 5/2018 |

\* cited by examiner

*Primary Examiner* — Nathaniel T Woodward
(74) *Attorney, Agent, or Firm* — Young Basile Hanlon & MacFarlane, P.C.

(57) ABSTRACT

A drive bearing includes an element rotatably mounted and which comprises magnetized magnetostrictive material. A torque can be applied to the element and the magnetostrictive magnetized material is formed to generate at a first position outside the element a magnetic field as a function of the torque applied. A measuring circuit comprises a first magnetic field sensor for detecting a total magnetic field at the first position, the total magnetic field comprising the magnetic field generated by the magnetostrictive magnetized material and an external magnetic field. The first magnetic field sensor outputs a first signal as a function of the total magnetic field detected. A second magnetic field sensor detects the external magnetic field at a second position and outputs a second signal as a function of the external magnetic field detected. The measuring circuit determines a value of the torque applied using the first and the second signals.

14 Claims, 2 Drawing Sheets

TORQUE MEASUREMENT WITH CORRECTION OF AN EXTERNAL MAGNETIC FIELD

CROSS-REFERENCE TO RELATED APPLICATION(S)

This application claims priority to European Patent Application Serial No. 21 186 292.5, filed Jul. 19, 2021, the entire disclosure of which is hereby incorporated by reference.

TECHNICAL FIELD

The invention relates to a drive bearing, in particular a bottom bracket, with a torque sensor.

BACKGROUND

Torque sensors are known in prior art and are installed in bottom brackets or drive bearings of pedelecs or e-bikes. An example of such a torque sensor, which is based on the principle of the inverse magnetostrictive effect, is disclosed in EP 3 050 790 B 1. A magnetized shaft of the bearing generates as a function of the torque applied a corresponding magnetic field outside the shaft which can be detected contactless using a magnetic field sensor.

The measurement of changes in the magnetic field as a function of a torque can be carried out by measuring coils in a measuring circuit which are influenced by the changed magnetic field. They are attached without contact in relation to the magnetized shaft (e.g. parallel to the axis of rotation) and detect changes in the magnetic field that occur under load due to inverse magnetostriction. The change in the magnetic field is typically directly proportional to the external application of a force and creates the relationship with the torque. For this purpose, a one-time calibration is carried out in the manufacturing phase of the torque sensor.

During the calibration, a constant residual magnetic field present at the measuring position of the magnetized shaft without any torque applied is also taken into account by establishing the zero point of a magnetic field-torque value profile so that the torque value zero is assigned to this residual magnetic field.

SUMMARY

However, this measurement method known from prior art has the drawbacks mentioned hereafter.

Magnetic interference fields can arise, either permanently or only temporarily, and falsify the measurement.

For example, repairs to the pedelec/e-bike, in particular to the drive bearing/bottom bracket or in the vicinity thereof, can result in the use of magnetized spare parts—such as a magnetic screw—which leads to a permanent additional magnetic field that affects the measurement and would require new calibration.

Another example is short-term magnetic interference or external magnetic fields, such as those that can arise when crossing induction loops in the ground or when passing under high-voltage lines. Such short-term magnetic interference or external magnetic fields can also generate an alternating magnetic field within the interference phase.

The earth's magnetic field as well can be an interfering magnetic field source, both constant as well as variable, the latter e.g. when driving past objects that change the earth's magnetic field such as stationary or moving vehicles.

The object underlying the invention is to overcome at least in part the drawbacks mentioned.

This object is satisfied by a drive bearing, in particular a bottom bracket, having a torque sensor.

According to claim 1, the drive bearing according to the invention comprises the following features: an element which is mounted to be rotatable about an axis of rotation and which comprises magnetized magnetostrictive material; where a torque can be applied to the element and the magnetostrictive magnetized material is formed to generate at a first position outside the element a magnetic field as a function of the torque applied; and a measuring circuit. The measuring circuit comprises a first magnetic field sensor for detecting at least one component of a total magnetic field at the first position, where the total magnetic field comprises the magnetic field generated by the magnetostrictive magnetized material and an external magnetic field, and where the first magnetic field sensor is configured to output a first signal as a function of the detected component of the total magnetic field; and a second magnetic field sensor for detecting at least one component of the external magnetic field at a second position, which differs from the first position, where the second magnetic field sensor is configured to output a second signal as a function of the external magnetic field detected; where the measuring circuit is configured to determine a value of the applied torque using the first and the second signal.

The influence of an interfering magnetic field upon the measurement of the magnetic field by the first magnetic field sensor and finally upon the torque determined can be corrected in this way. In particular, the measuring circuit can comprise an evaluation unit which is connected to the first and the second magnetic field sensors and determines the value of the torque.

The element mounted to be rotatable transmits the torque applied, e.g., from a drive device which can be connected to the element at one point, to a driven device which can be connected to the element at another point.

The drive bearing according to the invention can be further developed as follows.

A further development is that the measuring circuit can be configured to carry out a correction of the first signal using the second signal for determining the value of the torque applied; or that the measuring circuit can be configured to carry out a correction of a preliminary value of the determined torque from the first signal using the second signal for determining the value of the torque applied.

The signals can therefore be compared directly and a corrected output signal can be used to determine the torque applied, or a preliminary torque value can be determined which is corrected using a torque correction value corresponding to the second signal and is then output as an actual torque value.

Another further development is that the first signal represents a first measured variable that is proportional to the total magnetic field, and the second signal represents a second measured variable that is proportional to the external magnetic field.

Such proportionality simplifies processing the signals to determine a torque value.

This can be further developed such that the measuring circuit can be configured to compensate for an error caused by the external magnetic field in the first signal using the second signal, or that the measuring circuit can be configured to compensate for an error caused by the external magnetic field in the first measured variable using the second measured variable.

According to another further development, the second magnetic field sensor can detect the external magnetic field when the element is in a state that is unloaded in terms of the torque.

This has the advantage that the second magnetic field sensor is not influenced by the magnetic field of the magnetostrictive material of the element while the external magnetic field is being detected, since there is no torque applied that could cause a change in the magnetic field at the first position. In the case of a shaft as the element in a bottom bracket of a pedelec or e-bike, such unloaded states exist, for example, at the top and bottom dead centers of the pedals.

This can be further developed in that a measured value corresponding to the detected external magnetic field is used to determine the torque until the next unloaded state.

Another further development is that the second magnetic field sensor can be configured to detect an external magnetic field that is variable over time.

In this way, not only constant external magnetic fields can be taken into account, but also external magnetic fields that change over time, so that a respective correction can be made in real time.

The external magnetic field that is variable over time can be spatially homogeneous in such a way that the strength and direction of the external magnetic field at a specific point in time is the same at the first and the second position.

According to another further development, the second magnetic field sensor can be configured to detect a gradient of the external magnetic field, and the measuring circuit can be configured to determine the size of the external magnetic field at the first position as a function of the gradient.

Another further development is that the second magnetic field sensor comprises exactly one AMR sensor that is based on the anisotropic magnetoresistive effect (AMR effect). With an AMR sensor, the external magnetic field can be detected in terms of magnitude, direction, and in relation to a gradient. In particular, exactly one AMR sensor is sufficient for this.

Another further development is that the element is a drive shaft. This is advantageous for a bottom bracket, for example, for the reason that the shaft that is present anyway can also be used to measure torque in that it is magnetized at least in part.

The drive bearing can be a bottom bracket.

The invention also relates to a device that comprises a drive bearing according to the invention or one of its further developments, where the device is a pedelec or an e-bike.

According to another further development, the measuring circuit can be configured to determine the value of the torque applied by carrying out a correction with respect to a component with an external magnetic field that has been attached to the device after an initial calibration process of the measuring circuit.

Another further development is that the measuring circuit is configured to carry out a correction due to an external magnetic field generated by a power line when determining the value of the torque applied, and/or to carry out a correction due to an external magnetic field generated by an induction loop in a roadway, and/or to carry out a correction due to an external magnetic field generated by the earth's magnetic field.

Further features and exemplary embodiments as well as advantages of the present invention shall be illustrated below using the figures. It is understood that the embodiments do not exhaust the scope of the present invention. It is further understood that some or all features described hereafter can also be combined with each other in different ways.

DETAILED DESCRIPTION

Figure 1:
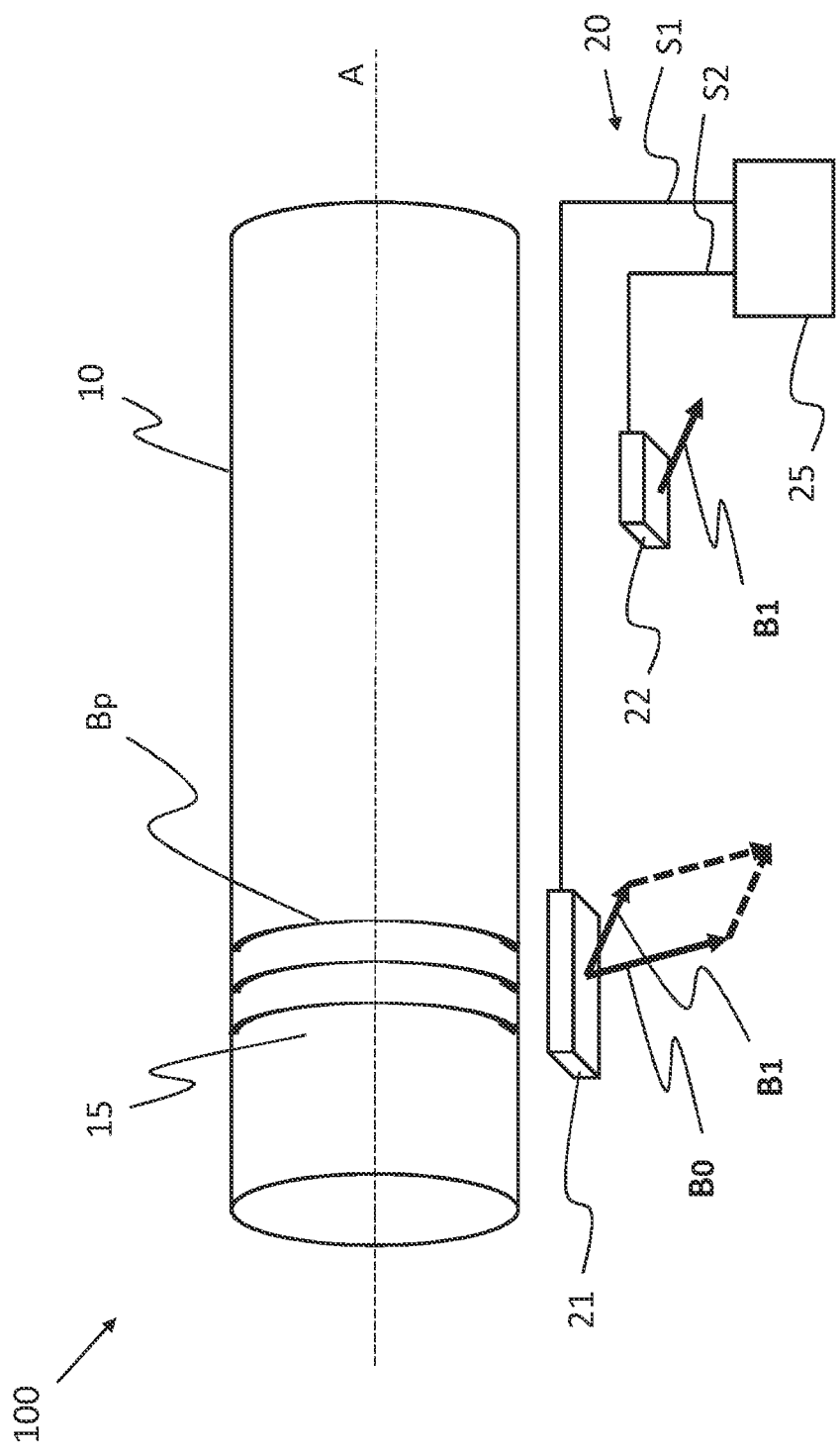
FIG. 1 shows a first embodiment of the drive bearing according to the invention.

FIG. 1 shows a first embodiment of the drive bearing 100 according to the invention.

The drive bearing 100 according to the invention comprises an element 10 which is mounted to be rotatable about an axis of rotation A, in this embodiment in the form of a shaft, and which comprises magnetized magnetostrictive material 15; where a torque can be applied to element 10 and magnetized magnetostrictive material 15 is formed to generate at a first position outside element 10 a magnetic field $B_0$ as a function of the torque applied; and a measuring circuit 20. Magnetized magnetostrictive material 15 is provided with a permanent magnetization $B_p$ in a region of the element. This can be achieved, for example, by an initial magnetization by way of current pulses through element 10.

Measuring circuit 20 comprises a first magnetic field sensor 21 for detecting at least one component of a total magnetic field $B_0+B_1$ at the first position, where the total magnetic field comprises magnetic field $B_0$ generated by the magnetostrictive magnetized material and an external magnetic field $B_1$, and where first magnetic field sensor 21 is configured to output a first signal as a function of the detected component of the total magnetic field; and a second magnetic field sensor 22 for detecting at least one component of external magnetic field $B_1$ at a second position, which differs from the first position, where second magnetic field sensor 22 is configured to output a second signal S2 as a function of external magnetic field $B_1$ detected; where measuring circuit 20 is configured to determine a value of the applied torque using first and second signal S1, S2.

During an initial (and typically one-off) calibration, a constant residual magnetic field of the magnetized shaft present at the first position (measuring position of first magnetic field sensor 21) without any torque applied is also taken into account by establishing the zero point of a magnetic field-torque value profile, so that this residual magnetic field is assigned the torque value zero at the first position (or the component thereof detected by first magnetic field sensor 21, respectively).

First magnetic field sensor 21 can comprise, for example, one or more measuring coils that detect a magnetic field component parallel to axis A. Alternatively or additionally, a magnetic field component perpendicular to axis A and/or another direction of the magnetic field and/or the absolute value of the magnetic field can be detected.

Second magnetic field sensor 22 can be, for example, an AMR sensor which is based on the anisotropic magnetoresistive effect.

Measuring circuit 20 processes signals S1 and S2 from the magnetic field sensors in order to correct the deviation from the actual value of the torque applied that is caused by the external magnetic field. In particular, measuring circuit 20 can comprise an evaluation unit 25 which determines a corrected value of the torque.

Second magnetic field sensor 22 can detect the external magnetic field in a state of the element that is unloaded in terms of the torque. In this way, second magnetic field sensor 22 is not influenced by the magnetic field of the magnetostrictive material of the element (e.g. by a magnetic field from the magnetized region of element 10 with the magnetostrictive material acting at the second position) while the external magnetic field is detected. If there is no torque present that could cause a change in the magnetic field at the first and the second position, then it is possible to precisely detect the external magnetic field. In the case of a shaft as the element in a bottom bracket of a pedelec or e-bike, such unloaded states exist, for example, at the top and bottom dead centers of the pedals. Otherwise, the external magnetic field can still be detected if the second position is sufficiently far away from the first position (greater than or equal to a predetermined distance), so that the influence of the magnetic field from element 10 at the second position is sufficiently low even when a torque is applied.

The respective measured value of the external magnetic field can be used to determine the torque until the next unloaded state.

The external magnetic field can be variable over time. The torque measurement is then corrected in real time. In this way, not only external magnetic fields that are constant over time can be taken into account, but also external magnetic fields that change over time.

In the case of a drive bearing in an e-bike, external magnetic field sources that vary over time can be relevant while riding. The change over time can result, firstly, from driving past the external magnetic field source and/or, secondly, from a variability of the source of the external magnetic field itself over time. For example, the measuring circuit can be configured to carry out a correction due to an external magnetic field generated by a power line (50 Hz alternating field) when determining the value of the torque applied, and/or to carry out a correction due to an external magnetic field generated by an induction loop in a roadway, and/or or to carry out a correction due to an external magnetic field generated by the earth's magnetic field.

The external magnetic field that is variable over time can be spatially homogeneous so that the strength and direction of the external magnetic field at a specific point in time is the same at the first and the second position.

However, the second magnetic field sensor can be configured to detect a gradient of the external magnetic field, and the measuring circuit can be configured to determine the size of the external magnetic field at the first position as a function of the gradient. In this way, a change due to the gradient from the second to the first position can be taken into account, for example, in that the size of the external magnetic field at the first position is extrapolated using the detected gradient, where such a calculation can be performed, in particular, in evaluation unit 25.

An example of an external magnetic field that is constant over time is the field of a spare part (e.g. magnetic screw) that is used for repairs, i.e. an interfering magnetic field that arises after the original calibration.

Figure 2:
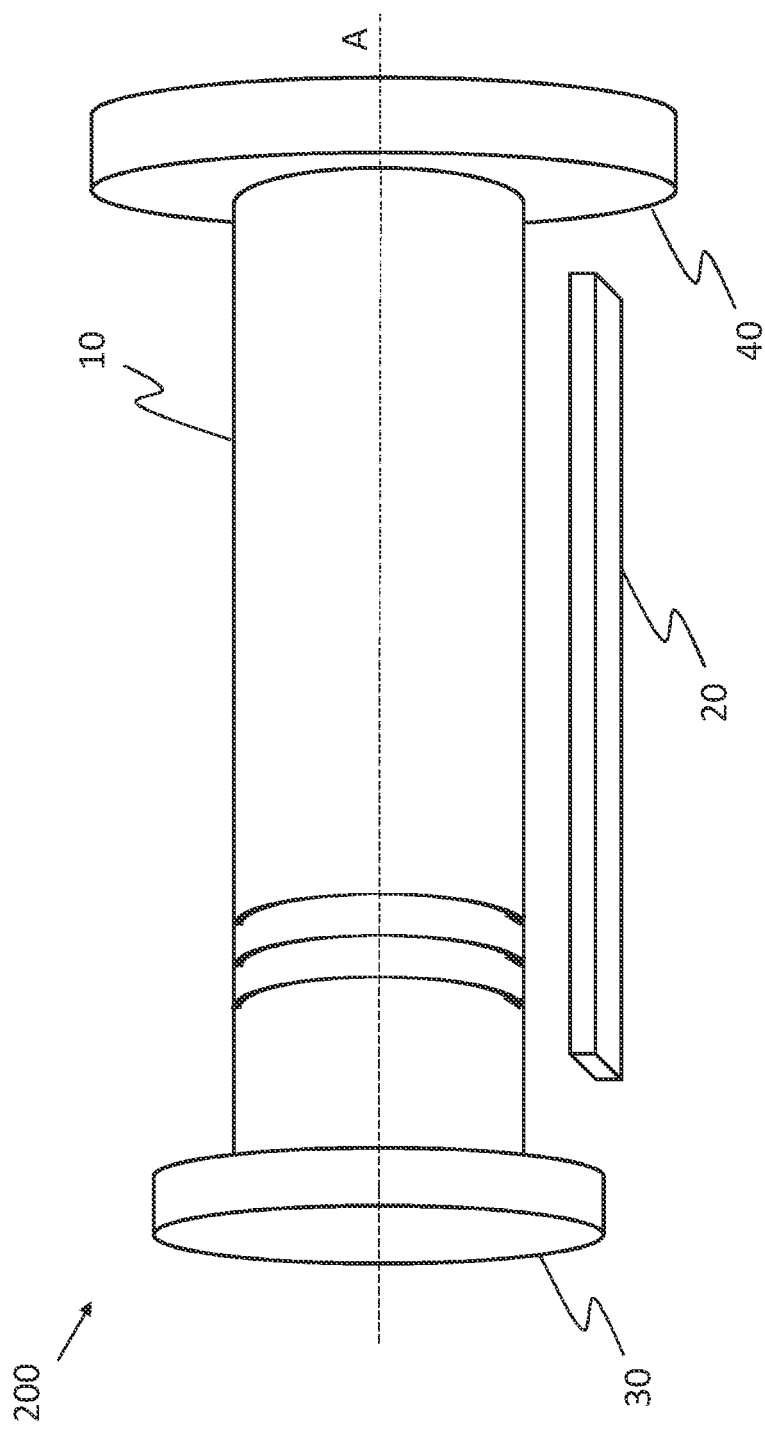
FIG. 2 shows a second embodiment of the drive bearing according to the invention.

FIG. 2 shows a second embodiment of the drive bearing 200 according to the invention.

The drive bearing 200 of this second embodiment corresponds to that of the first embodiment according to FIG. 1, where measuring circuit 20 is presently indicated only schematically. In addition, however, drive device 30 and driven device 40 are shown there.

Drive device 30 is connected, for example, to an electric drive motor of an e-bike or is part thereof. Driven device 40 can be a chainring carrier or a chainring, which in turn drives a wheel by way of a chain.

The embodiments illustrated are only by way of example and the full scope of the present invention is defined by the claims.

What is claimed is:

1. A drive bearing, comprising:
    an element which is mounted to be rotatable about an axis of rotation and which comprises magnetized magnetostrictive material, wherein a torque can be applied to the element and the magnetostrictive magnetized material is formed to generate at a first position outside the element a magnetic field as a function of the torque applied; and
    a measuring circuit, comprising:
        a first magnetic field sensor for detecting at least one component of a total magnetic field at the first position, wherein the total magnetic field comprises the magnetic field generated by the magnetostrictive magnetized material and an external magnetic field, and wherein the first magnetic field sensor is configured to output a first signal as a function of the at least one detected component of the total magnetic field; and
        a second magnetic field sensor for detecting at least one component of the external magnetic field at a second position, which differs from the first position, wherein the second magnetic field sensor is configured to output a second signal as a function of the at least one detected component of the external magnetic field;
    wherein the second magnetic field sensor detects the external magnetic field when the element is in a state that is unloaded in terms of the torque, wherein a measured value corresponding to a detected external magnetic field is used to determine the torque until a next unloaded state; and
    wherein the measuring circuit is configured to determine a value of the applied torque using the first and the second signal.

2. The drive bearing according to claim 1, wherein the measuring circuit is configured to carry out a correction of the first signal using the second signal for determining the value of the torque applied.

3. The drive bearing according to claim 1, wherein the first signal represents a first measured variable that is proportional to the total magnetic field, and the second signal represents a second measured variable that is proportional to the external magnetic field.

4. The drive bearing according to claim 3, wherein the measuring circuit is configured to compensate for an error caused by the external magnetic field in the first signal using the second signal, or wherein the measuring circuit is configured to compensate for an error caused by the external magnetic field in the first measured variable using the second measured variable.

5. The drive bearing according to claim 1, wherein the second magnetic field sensor is configured to detect an external magnetic field that is variable over time.

6. The drive bearing according to claim 5, wherein the external magnetic field that is variable over time is spatially homogeneous in such a way that strength and direction of the external magnetic field at a specific point in time is the same at the first and the second position.

7. The drive bearing according to claim 1, wherein the second magnetic field sensor is configured to detect a gradient of the external magnetic field, and the measuring circuit is configured to determine a size of the external magnetic field at the first position as a function of the gradient.

8. The drive bearing according to claim 1, wherein the second magnetic field sensor comprises exactly one AMR sensor.

9. The drive bearing according to claim 1, wherein the element is a drive shaft.

10. The drive bearing according to claim 1, wherein the drive bearing is a bottom bracket.

11. The drive bearing according to claim 1, wherein the measuring circuit is configured to carry out a correction due to one or more of an external magnetic field generated by a power line when determining the value of the torque applied, an external magnetic field generated by an induction loop in a roadway, and an external magnetic field generated by earth's magnetic field.

12. The drive bearing according to claim 1, wherein the measuring circuit is configured to carry out a correction of a preliminary value of a determined torque from the first signal using the second signal for determining the value of the torque applied.

13. A device comprising the drive bearing according to claim 1, wherein the device is a pedelec or an e-bike.

14. A device comprising the drive bearing according to claim 1, wherein the measuring circuit is configured to determine the value of the torque applied by carrying out a correction with respect to a component with an external magnetic field that has been attached to the device after an initial calibration process of the measuring circuit.

* * * * *